US011583961B2

(12) United States Patent
Becker et al.

(10) Patent No.: US 11,583,961 B2
(45) Date of Patent: Feb. 21, 2023

(54) METHODS AND APPARATUS FOR STRUCTURAL REINFORCEMENT OF VEHICLE SUSPENSION MEMBERS

(71) Applicant: Fox Factory, Inc., Duluth, GA (US)

(72) Inventors: William M. Becker, Aptos, CA (US); Derek D. Beich, Santa Cruz, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 16/995,569

(22) Filed: Aug. 17, 2020

(65) Prior Publication Data

US 2020/0376612 A1 Dec. 3, 2020

Related U.S. Application Data

(60) Continuation of application No. 14/947,157, filed on Nov. 20, 2015, now Pat. No. 10,744,602, which is a continuation of application No. 14/292,586, filed on May 30, 2014, now abandoned, which is a division of application No. 13/174,265, filed on Jun. 30, 2011, now Pat. No. 8,769,793.

(60) Provisional application No. 61/360,331, filed on Jun. 30, 2010.

(51) Int. Cl.
*B23P 11/02* (2006.01)
*B62K 21/04* (2006.01)
*B62K 25/08* (2006.01)

(52) U.S. Cl.
CPC ............. *B23P 11/025* (2013.01); *B23P 11/02* (2013.01); *B62K 21/04* (2013.01); *B62K 25/08* (2013.01); *B23P 2700/14* (2013.01); *Y10T 29/49865* (2015.01); *Y10T 29/53383* (2015.01); *Y10T 29/53439* (2015.01)

(58) Field of Classification Search
CPC ..... B23P 2700/14; B23P 11/025; B23P 19/00; B23P 19/04; B23P 11/005; B23P 11/02; B23P 15/00; F16B 4/00; F16B 4/006; Y10T 29/53383; Y10T 29/49826; Y10T 29/49863; Y10T 29/49865; Y10T 29/49945; Y10T 29/53439; Y10T 29/49616; Y10T 29/49622; B21D 37/16
USPC ......... 29/428, 446, 447, 525, 800, 787, 987, 29/897.2
See application file for complete search history.

(56) References Cited

U.S. PATENT DOCUMENTS

| 4,449,281 A | * | 5/1984 | Yoshida ............... B23K 31/027 138/140 |
| 5,016,895 A |   | 5/1991 | Hollingsworth et al. |
| 5,762,352 A |   | 6/1998 | Lee |
| 5,934,697 A |   | 8/1999 | McAndrews |
| 6,406,048 B1 | * | 6/2002 | Castellano ............ B62K 25/04 280/284 |

(Continued)

FOREIGN PATENT DOCUMENTS

EP 1070659 A2 1/2001

OTHER PUBLICATIONS

"International Search Report and Written Opinion, International Application No. PCT/US2011/042703", dated Dec. 6, 2011.

*Primary Examiner* — Saran G Afzali
*Assistant Examiner* — Darrell C Ford

(57) ABSTRACT

A method and apparatus for assembling a suspension. In one embodiment, a method includes altering a temperature of a first suspension component and then pressing the first suspension component and a second suspension component into engagement while the temperature remains substantially altered.

6 Claims, 5 Drawing Sheets

(56) References Cited

U.S. PATENT DOCUMENTS

| | | | |
|---|---|---|---|
| 6,412,167 B1 | 7/2002 | Vignocchi et al. | |
| 6,893,037 B1* | 5/2005 | Galasso | B62K 25/08 |
| | | | 280/279 |
| 8,083,246 B2 | 12/2011 | White | |
| 8,672,096 B2 | 3/2014 | Galasso et al. | |
| 8,769,793 B2 | 7/2014 | Becker et al. | |
| 8,827,295 B2 | 9/2014 | Lavabre | |
| 9,956,838 B2 | 5/2018 | Mosteiro Goyoaga | |
| 10,744,602 B2* | 8/2020 | Becker | B62K 25/08 |
| 2003/0001358 A1* | 1/2003 | Becker | B62K 25/06 |
| | | | 280/276 |
| 2004/0052598 A1* | 3/2004 | Haimer | B23B 31/02 |
| | | | 408/240 |
| 2004/0262879 A1* | 12/2004 | Kinzler | B62K 21/22 |
| | | | 280/276 |
| 2005/0037633 A1* | 2/2005 | Endo | H01R 13/506 |
| | | | 439/36 |
| 2006/0263557 A1* | 11/2006 | Watson | F16L 9/147 |
| | | | 428/36.91 |
| 2008/0007022 A1 | 1/2008 | Jones | |
| 2008/0018035 A1 | 1/2008 | Porter et al. | |
| 2009/0243251 A1* | 10/2009 | Galasso | B62K 21/02 |
| | | | 280/279 |
| 2010/0102530 A1 | 4/2010 | Achenbach | |
| 2010/0139077 A1* | 6/2010 | Linzell | F16L 37/02 |
| | | | 29/525 |
| 2010/0225081 A1 | 9/2010 | Galasso et al. | |
| 2011/0278816 A1 | 11/2011 | Chamberlain | |
| 2013/0161925 A1 | 6/2013 | Lavabre | |
| 2014/0041971 A1* | 2/2014 | Hujer | B62L 1/16 |
| | | | 188/72.7 |

* cited by examiner

METHODS AND APPARATUS FOR STRUCTURAL REINFORCEMENT OF VEHICLE SUSPENSION MEMBERS

CROSS-REFERENCE TO RELATED APPLICATIONS

This patent application is a continuation application of and claims the benefit of co-pending U.S. patent application Ser. No. 14/947,157, filed Nov. 20, 2015, entitled, "METHODS AND APPARATUS FOR STRUCTURAL REINFORMCEMENT OF VEHICLE SUSPENSION MEMBERS", by Becker et al., assigned to the assignee of the present application, which is incorporated herein in its entirety by reference thereto.

The U.S. patent application Ser. No. 14/947,157 is a continuation application of and claims the benefit of U.S. patent application Ser. No. 14/292,586, filed May 30, 2014, now abandoned, entitled, "METHODS AND APPARATUS FOR STRUCTURAL REINFORMCEMENT OF VEHICLE SUSPENSION MEMBERS", by Becker et al., assigned to the assignee of the present application, which is incorporated herein in its entirety by reference thereto.

The U.S. patent application Ser. No. 14/292,586 is a divisional application of and claims the benefit of U.S. patent application Ser. No. 13/174,265, filed on Jun. 30, 2011 and is now Issued U.S. Pat. No. 8,769,793, entitled, "METHODS AND APPARATUS FOR STRUCTURAL REINFORMCEMENT OF VEHICLE SUSPENSION MEMBERS", by Becker et al., assigned to the assignee of the present application, which is incorporated herein in its entirety by reference thereto.

The U.S. patent application Ser. No. 13/174,265 claims priority to and benefit of U.S. Provisional Patent Application 61/360,331, filed Jun. 30, 2010, entitled, "METHODS AND APPARATUS FOR STRUCTURAL REINFORMCEMENT OF VEHICLE SUSPENSION MEMBERS", by Becker et al., assigned to the assignee of the present application, which is incorporated herein in its entirety by reference thereto.

BACKGROUND OF THE INVENTION

Field of the Invention

The present invention relates to vehicle suspensions. More particularly, the invention relates to methods and apparatus to assemble vehicle suspensions.

Description of the Related Art

Vehicle suspension systems typically include separate and distinct structural members that, due to their shape and the materials of their construction, must be separately fabricated and then assembled. Thereafter, the assemblies must resist forces tending to twist and/or bend them. That often means that the structures need to be assembled such that relative axial and/or rotational movement between certain components is minimized. In many application it is also desirable to coat certain suspension components with low friction and/or corrosion resistant material in order to increase performance. What is needed are manufacturing methods and systems that allow suspension parts to be assembled in rigid interference with other suspension parts without damaging any of such assembled parts.

SUMMARY OF THE INVENTION

The present invention generally relates to methods and apparatus for assembling vehicle suspensions. In one embodiment, a method includes altering a temperature of a first suspension component and then pressing the first suspension component and a second suspension component into engagement while the temperature remains substantially altered. In one embodiment, the vehicle suspension is a fork.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
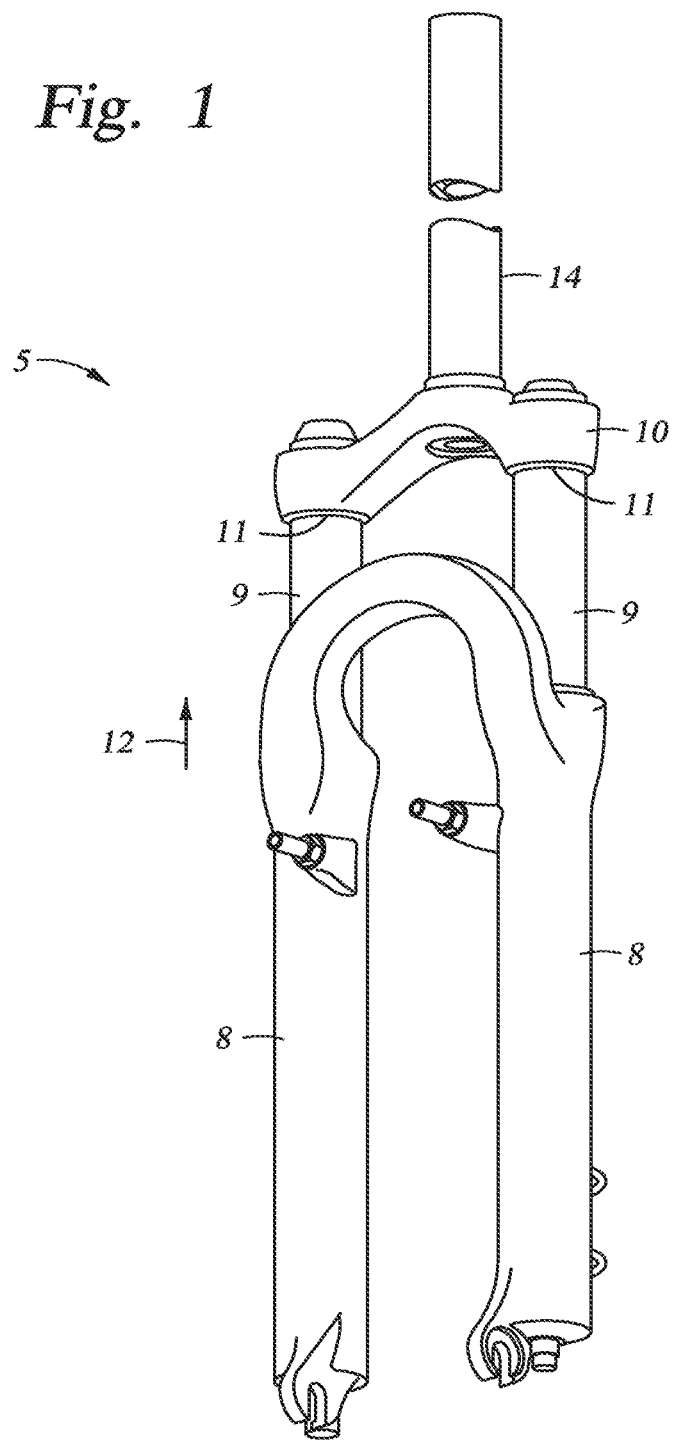
FIG. 1 is a perspective view of a vehicle suspension, namely, a front fork.

In one embodiment, the suspension members comprise two parts that are press-fit together in an assembly step by inserting an outer diameter surface of a first part into an inner diameter surface of another. In one embodiment, the vehicle is a two-wheeled vehicle such as a bicycle or motorcycle. FIG. 1 is a perspective view of a fork 5. The fork 5 comprises a pair of upper, front suspension fork legs 9 connected by a steering crown 10. At a lower end the fork tube 9 interacts with receiving members 8 to provide shock absorbing characteristics due to the actions of a spring and damper housed in the fork 5. As shown in FIG. 1, the crown 10 is located at the upper end of the fork 5 where it is connected to each fork tube 9 and serves to convert a single tube 14 coming from steering bars (not shown) to the dual-tubed fork 5.

In one embodiment of an assembly method, an upper end of each of the fork legs 9, opposite the receiving member 8, is pressed, in direction 12 relative to the crown 10, into a respective circumferential opening 11 of the crown 10. Each opening 11 forms access to an inner diameter on a respective side of the crown 10 (corresponding respectively to the shown openings 11). Each inner diameter is sized to be slightly smaller than an outer diameter of an end of the corresponding leg 9 (for each leg 9 respectively), thereby permitting the legs to be press-fit into engagement with the crown openings 11.

Such pressing results in an interference fit that is sufficient to retain or fix the fork legs 9 within the crown 10 in a substantially rigid manner both rotationally and axially during use of the suspension product that includes the legs 9/crown 10 assembly.

In one embodiment substantial structural damage to either of the crown 10 (e.g. inner diameter of openings 11) and legs 9 (e.g. outer diameter of the legs) is avoided during pressing by using thermal expansion to modify the size of the inner diameter of the crown openings 11 during assembly. Similarly, the outer diameter of the fork legs 9 can be reduced to size using methods to cause contraction, typically through the application of cold, such as for example by means of dipping the fork leg end in a cryogenic liquid such as nitrogen or less rigorously by exposure to dry ice. In still other arrangements, the size of both the inner and outer diameters are adjusted to achieve and temporarily maintain a change in their size. In one non-limiting embodiment, a heating device like an oven such as a counter top type convection oven, is preheated to 300 degrees Fahrenheit using any number of temperature monitoring devices, like a thermometer or infrared sensor. A crown 10 (or other part to be heated) is placed in the oven and allowed to heat-soak at temperature for a predetermined and timed period, such as 10 minutes. The fork legs 9 for assembly with the heated crown 10, are allowed to remain at ambient temperature of approximately 70 degrees Fahrenheit. The differential temperature treatment of the crown 10 versus the fork legs 9 causes the inner diameter (of opening 11) of the crown to enlarge relative to the outer diameter of the ends 13 of the legs 9. The thermal coefficient of expansion and the mass and dimensions (and material e.g. aluminum) of the crown 10 are such that the inner diameter of the crown 10 becomes larger than the outer diameter of the end 13 of the legs 9 while the crown remains at elevated temperature as soaked at 300 degrees F. for example. Aluminum has a positive thermal coefficient of 0.000023 mm per degree Celsius. For example, a 1 meter bar will expand 2.3 mm in length if its temperature increases 100 degrees C. Similarly, the inner diameter of a tubular shape, like opening 11 in the aluminum crown, will increase in size accordingly, causing the crown 10 to more easily receive the mating male fork tube while the crown 10 remains soaked with heat (at elevated temperature).

With the crown 10 and legs 9 in the aforementioned thermal differential state, assembly may take place by inserting the legs 9 into the crown openings 11. However, the assembly must take place fairly quickly and precisely lest the heat transfer between the relatively cool legs 9 and the relatively hot crown 10 tend to equalize the temperature between the two and thereby return them to a state of interference between the outer diameter of the leg 9 and the inner diameter of the opening 11 (thereby arresting the complete axial insertion of the leg 9 into the crown opening 11).

Figure 2:
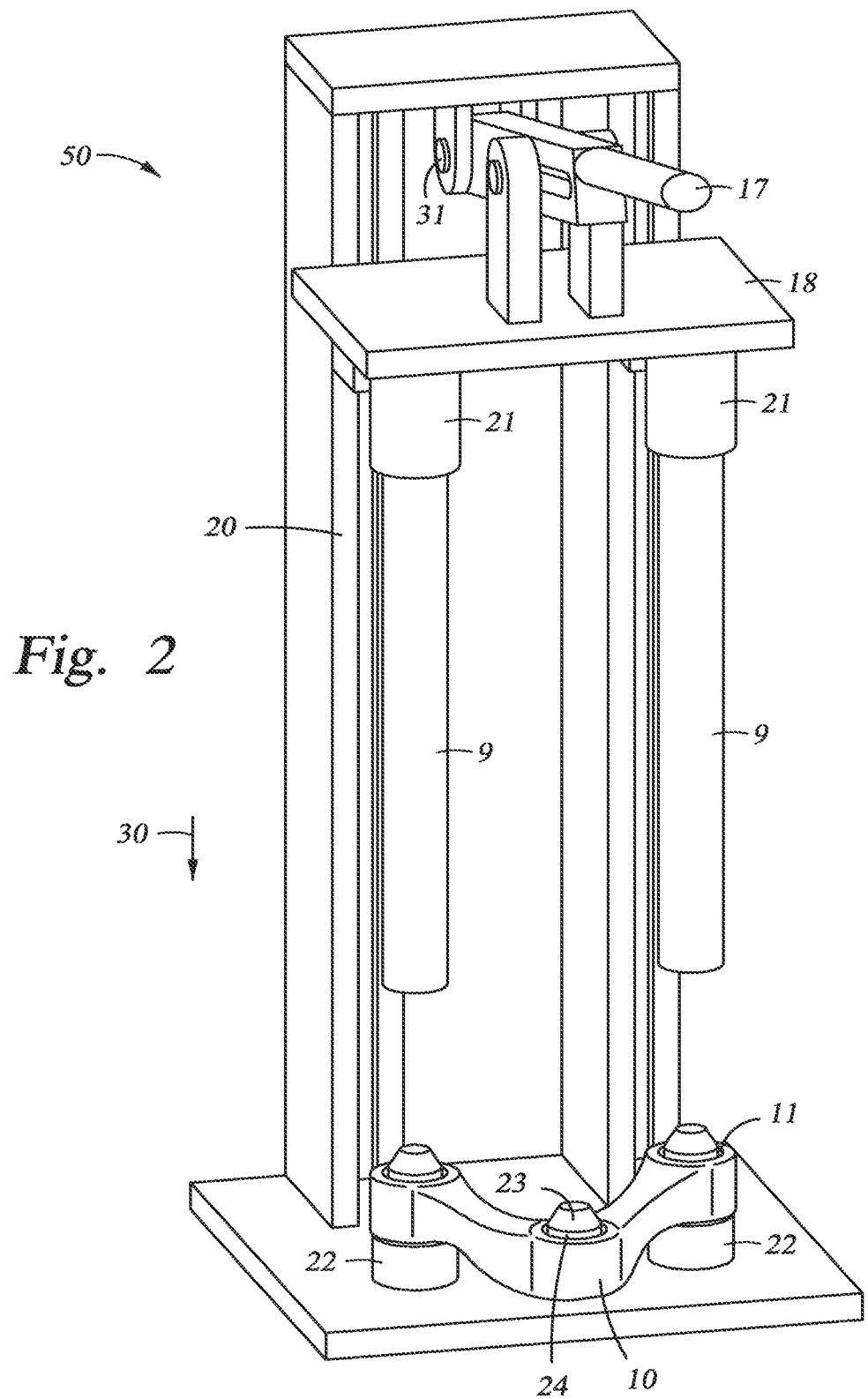
FIG. 2 is a perspective view of a press for use in assembling suspension members shown with a fork crown at its lower end and a pair of fork legs fixed in its upper end.

To facilitate the timely and repeatably precise assembly, a pressing apparatus and assembly process is disclosed. FIG. 2 shows a perspective view of an embodiment of a press 50 for use in assembling suspension members. The press 50 is shown with a crown 10 at its lower end and a pair of fork legs 9 fixed in its upper end ready to be press-fit into openings 11 of the crown 10. The press 50 comprises a slider 18 which travels axially up and down on a track 20 substantially in a direction 30 in response to lever 17 being pivoted (e.g. manually) and imparting movement to the slider 18 via pin 31. The track 20 is fixed to a base which includes crown leg alignment pins 22 and a crown steering mount datum pin 23. Affixed to the slider 18 are fork leg retainers 21 (one for each tube). In one embodiment each fork leg 9 fits into an inner diameter of one of the retainers 21 where they are held fixed in a frictional relationship with the slider 18 at ambient temperature until assembly. While the retainers shown are made to receive the fork legs in a female/male relationship, the retainers could easily be made whereby they are inserted into an ID of the fork tubes.

Figure 2A:
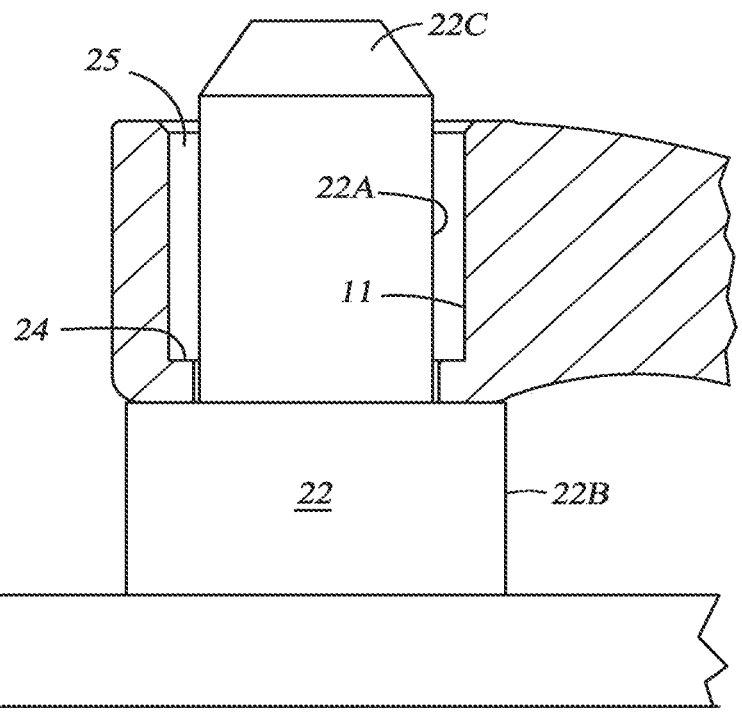
FIG. 2A is an enlarged section view of the lower part of the press of FIG. 2.

FIG. 2A shows an enlarged section view of the arrangement of FIG. 2 and illustrates the relationship between the pins 22 and openings 11 of the crown 10. Directly preceding assembly, the temperature-soaked crown 10 is removed from a heating source (not shown) and placed "upside down" with a steering tube opening 24 around the steering mount datum pin 23 (FIG. 2). A shown in FIG. 2A, each opening 11 fits around a smaller diameter portion 22A of one each of the alignment pins 22 and in centralized alignment with a larger lower diameter portion 22B of the respective alignment pin 22. A conical shape 22C at an upper end of each pin 22 is intended to provide alignment for the fork legs 9 as they come into contact with the pin 22 during assembly. In the embodiment shown, opening 11 of the crown 10 includes a shoulder 24 constructed and arranged to be abutted by an end 13 of leg 9 as it moves into the opening during expansion to fill a gap 25 left between the smaller diameter portion 22A and an inner diameter of opening 11.

Figure 3A:
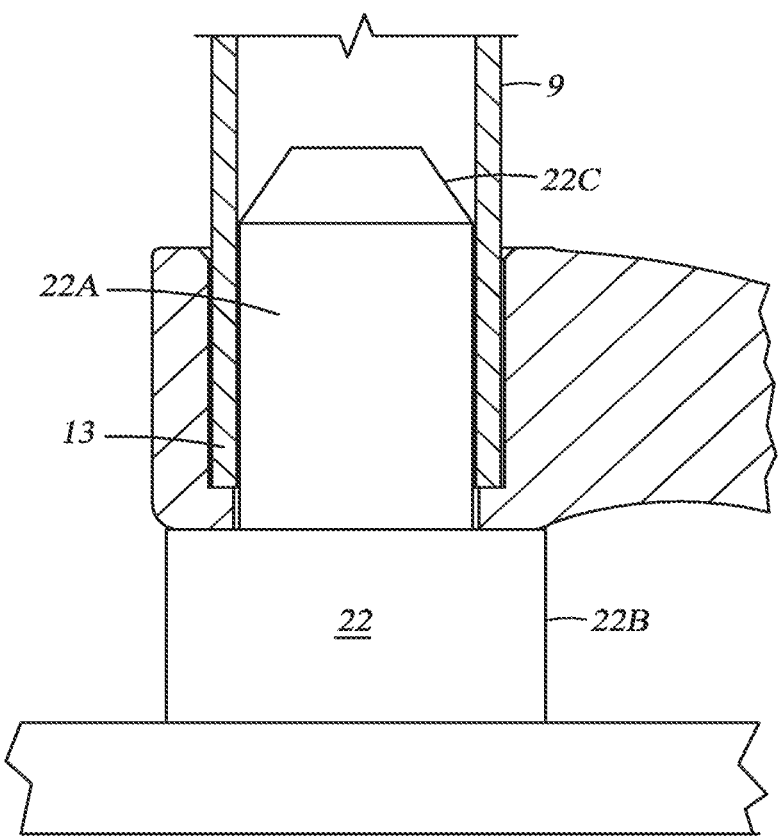
FIG. 3A is an enlarged section view of the lower part of the press of FIG. 3.
Figure 3:
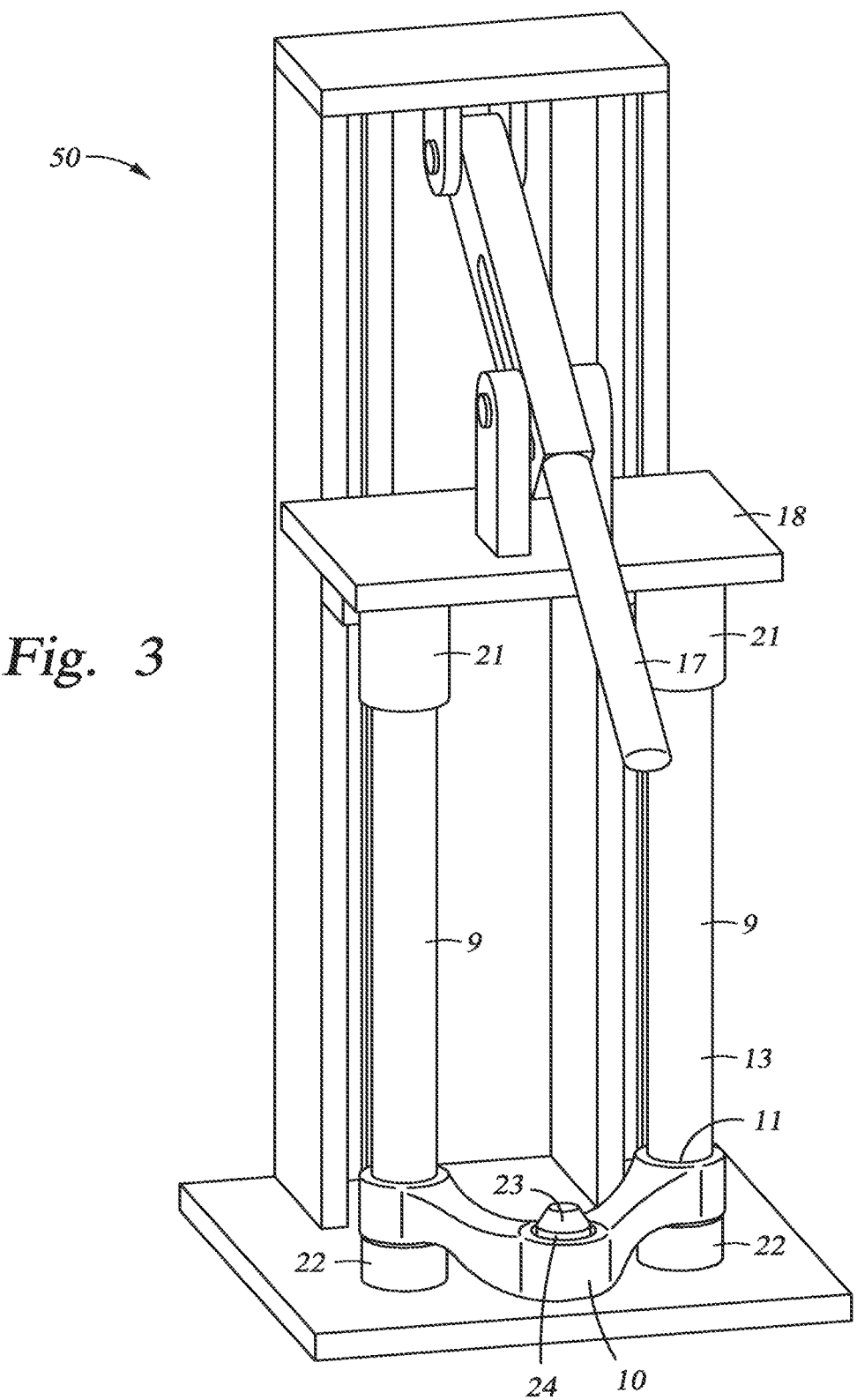
FIG. 3 is a view of the press of FIG. 2 showing the assembled suspension after the fork legs have been inserted into the crown.

FIG. 3 shows a view of the press 50 of FIG. 2 additionally showing the assembled suspension after the fork legs 9 have been inserted into the crown 10. As shown, pins 22, 23 have served to hold the crown 10 in place and also ensured that the openings 11 are properly aligned with the fork legs 9. The lever 17 has been manually displaced so as to move the slider 18 axially downward, thereby engaging the end 13 of each suspended, ambient temperature leg 9 with a respective one of the heat-soaked openings 11. The upper, smaller diameter portion 22A of the alignment pin 22 is engaged by an inner diameter of an end 13 of a leg 9 as the leg 9 progresses downward with the slider 18. In one embodiment an operator will manually and smoothly continue to pull down on lever 17 until each leg 9 has abutted against shoulder 24 of opening 11 (FIG. 3A). The alignment pins 22 are configured such that each leg 9 will be property assembled in the crown 10 upon such abutment of the leg 9 against the shoulder 24. In another embodiment, the leg 9 is installed when it abuts the large diameter upset formed between 22A and 22B of pin 22.

FIG. 3A shows an enlarged section view of the arrangement of FIG. 3 and illustrates the relationship between the various parts after assembly. As shown, a lower end 13 of fork leg 9 has been lowered past conical shape 22C and inserted between an inner diameter of opening 11 and an outer diameter of the leg 9. The lower-most end of the fork leg 9 is shown in abutment of shoulder 24. Barely visible is a remainder of gap 25 that still exists in the area of the press fit. The small opening represents the still-enlarged opening 11 that continues to be heat-soaked throughout the assembly process.

After the legs 9 have abutted the shoulders of openings 11, lever 17 is raised and the legs 9, now fixed to the crown 10, slide out from retention by retainers 21 as the slider 18 is raised with the lever 17. Thereafter, the leg 9/crown 10 is removed from the press 50 and optionally, placed within a separate cooling frame (not shown). The purpose of the separate cooling frame is to retain the just-assembled part and facilitate a cooling so that the parts assume a uniform, ambient temperature. In one embodiment, air or other suitable coolant is supplied through a line to air knives and coolant gas is blown from air knives in a direction causing it ti impinge upon the recently assembled area of openings 11 and ends 13. The legs 9/crown 10 assembly remains under the coolant flow until the assembly is sufficiently cool (e.g. equalized at a temperature under 100 degrees F.).

Following cooling, the leg 9/crown 10 assembly is optionally tested for assembly strength by placing it in test press. In a typical test press, the leg 9/crown 10 assembly is supported by the crown 10 on a platform and the legs 9 are freely suspended. Press adapters (one for each leg) are placed over each upper end of the legs 9 such that the press adapters axially abut the upper ends of legs 9. Hydraulic fluid is then supplied to press cylinders. Upon engagement, the test press is pressurized until a predetermined test force is generated axially downward against the upper ends of the legs 9. In one embodiment such a force may be 300 pounds force. The criteria for passing the test is that the legs are not axially moved (relative to the fixed crown) by application of the test force.

Figure 4:
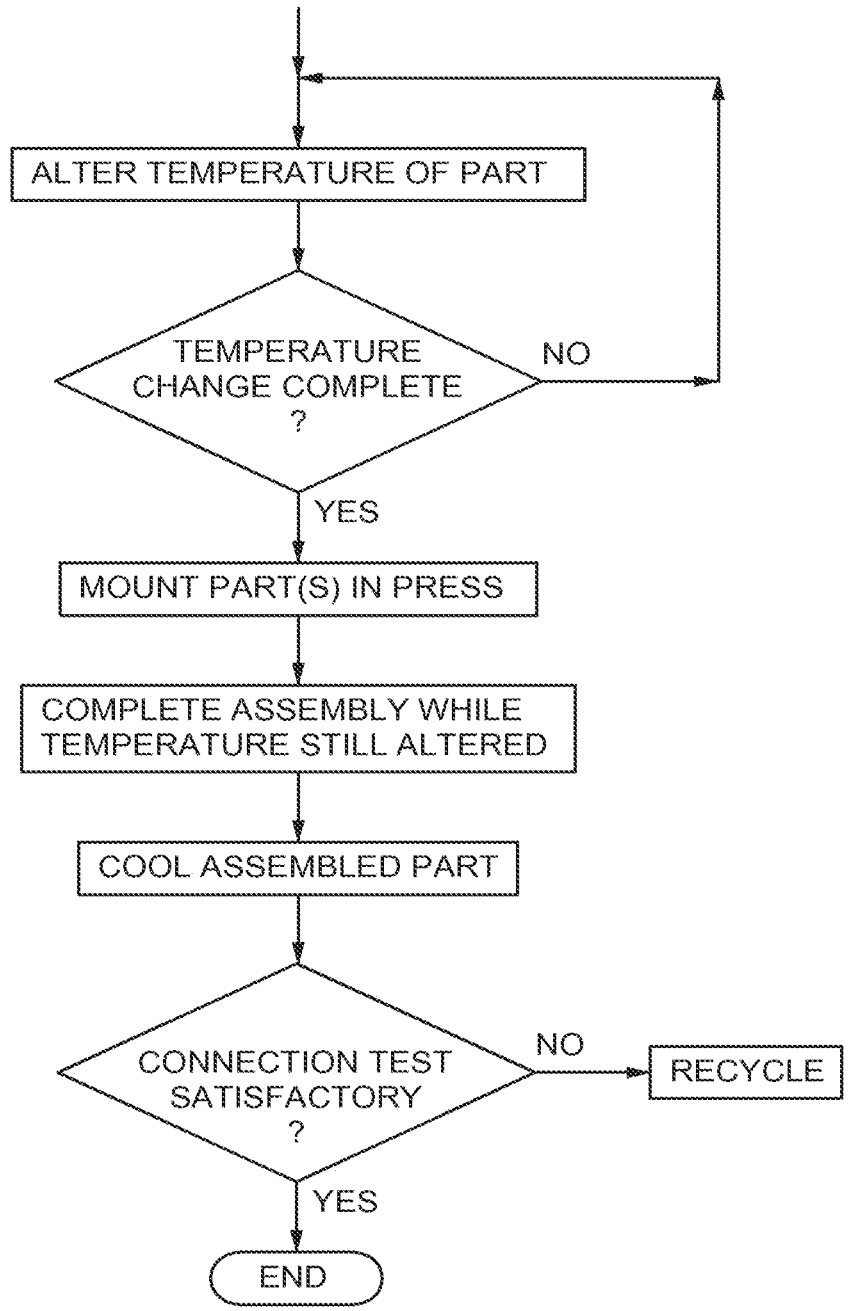
FIG. 4 is a flow chart illustrating typical steps involved in an assembly of suspension members according to embodiments herein.

FIG. 4 shows a flow chart illustrating the steps typically involved in an assembly operation described herein. First, the temperature of the part is altered, typically through the use of a temperature altering chamber and the temperature is checked until the predetermined temperature is reached. Then the part is mounted in the press and the assembly operation takes place with parts assembled to a predetermined relative position in a predetermined amount of time. The assembly part is then cooled in one of a variety of ways and finally, the connection made by the process is tested.

While the foregoing has been exemplified using embodiments comprising thermal expansion of a crown 10 with ambient treatment of corresponding legs 9 other alternatives may be equally suitable. For example, the legs 9 may be treated cryogenically to reduce their diameter while the crown 10 remains substantially ambient. In another alternative, the legs 9 may be treated cryogenically while the crown 10 is treated at elevated temperature. The assembly press 50 may be automated with suitable air cylinders and supply pressure, with preset pressure "blow-off" or overpressure relief, versus manual manipulation. Ovents may be used to heat components and be equipped with thermostats, infrared thermal sensors for part soak-time determination and automated shut-off. In one alternative embodiment, a temperature altering device is incorporated into the press whereby the crown is enlarged with heat and/or the legs are reduced in size with cold while they are in a "ready" position in the press. One alternative includes an induction device that heats the aluminum crown by electromagnetic induction. At a predetermined time, after their sizes have been temporarily altered through temperature treatment, the parts are assembled together and permitted to return to ambient temperature or cooled. Such an arrangement is within the scope of this specification.

In one embodiment the legs 9 are coated with a coating such as anodized zinc or Kashima™ or are nitride or otherwise surface treated and are particularly vulnerable to scoring or galling during press type assembly. It is important for integrity of the assembly that such coatings not be scored or parts subject to galling during assembly. The methods and apparatus described herein are well suited for assembly of such pre-coated component parts.

In one embodiment, the vehicle suspension fork comprises a crown having first and a second fork tube openings with a first fork tube retained in the first fork tube opening wherein such retention creates a compressive hoop stress in the first fork tube and a tensile hoop stress in the first opening but creates no substantial axial stress in either of the first tube or the first opening. A second fork tube is retained in the second fork tube opening wherein such retention creates a compressive hoop stress in the second fork tube and a tensile hoop stress in the second opening but creates no substantial axial stress in either of the second tube or the second opening. The fork is made by the process of: conditioning a first portion of the suspension fork to a non-ambient temperature; precisely positioning the first portion relative to at least one second portion of the suspension fork while the non-ambient temperature remains substantially as conditioned; and returning the assembled portions to substantially ambient temperature.

In another embodiment, a vehicle suspension fork comprises: a crown having a first and a second fork tube opening; a first fork tube retained in the first fork tube opening wherein such retention creates a compressive hoop stress in the first fork tube and a tensile hoop stress in the first opening but creates no substantial axial stress in either of the first tube or the first opening; a second fork tube retained in the second fork tube opening wherein such retention creates a compressive hoop stress sin the second fork tube and a tensile hoop stress in the second opening but creates no substantial axial stress in either of the second tube or the second opening. In one embodiment, the fork further includes a surface treatment interposed between the fork tubes and respective openings where the surface treatment is substantially intact and in compression.

While the foregoing is directed to embodiments of the present invention, other and further embodiments of the invention may be devised without departing from the basic scope thereof, and the scope thereof is determined by the claims that follow.

What we claim is:

1. A method for assembling a suspension comprising:
   altering a temperature of at least one suspension component from an ambient temperature to a non-ambient temperature;
   press-fitting the at least one suspension component with another component;
   returning the press-fitted at least one suspension component and the another component to the ambient temperature; and
   testing the connection between the press-fitted at least one suspension component and the another component, wherein the testing is performed with the use of a testing press.

2. The method as recited in claim 1, wherein the temperature is checked and compared to a predetermined temperature.

3. The method as recited in claim 1, wherein before the at least one suspension component and the another component are press-fit, the at least one suspension component and the another component are installed in an assembly press.

4. The method as recited in claim 1, wherein the press-fitting is completed while the temperature of the at least one suspension component and the another component remains at said non-ambient temperature.

5. The method as recited in claim 1, wherein the at least one suspension component and the another component are returned to the ambient temperature through the use of directed air.

6. The method as recited in claim 5, wherein the temperature is altered using heat and the directed air is for cooling.

* * * * *